(12) United States Patent
Pilcher

(10) Patent No.: US 7,338,121 B1
(45) Date of Patent: Mar. 4, 2008

(54) RETRACTING CHILD SEAT RESTRAINING STRIKER AND METHODS OF USE

(75) Inventor: Kenneth Pilcher, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/548,030

(22) Filed: Oct. 10, 2006

(51) Int. Cl.
*B60N 2/28* (2006.01)

(52) U.S. Cl. .................................. 297/253; 297/378.12

(58) Field of Classification Search ............. 297/250.1, 297/253, 463.1, 378.12
See application file for complete search history.

(56) References Cited

U.S. PATENT DOCUMENTS

| | | | |
|---|---|---|---|
| 5,918,934 A | | 7/1999 | Siegrist |
| 5,941,601 A | * | 8/1999 | Scott et al. .................. 297/253 |
| 6,030,046 A | * | 2/2000 | Dorow ........................ 297/464 |
| 6,082,818 A | | 7/2000 | Muller |
| 6,196,628 B1 | | 3/2001 | Goy et al. |
| 6,354,648 B1 | | 3/2002 | Allan et al. |
| 6,390,560 B1 | | 5/2002 | Gandhi et al. |
| 6,547,329 B2 | | 4/2003 | Deptolla |
| 6,604,793 B2 | | 8/2003 | Habedank |
| 6,631,958 B1 | | 10/2003 | Herrmann et al. |
| 7,178,873 B2 | * | 2/2007 | Foelster et al. ............. 297/253 |
| 2004/0084940 A1 | | 5/2004 | Morita |

* cited by examiner

*Primary Examiner*—Peter R. Brown
(74) *Attorney, Agent, or Firm*—Mark E. Duell; Cermak Kenealy & Vaidya LLP

(57) ABSTRACT

A vehicle child seat restraining system automatically retracts out of the way of folding portions of the seat, so that the striker of the system does not impinge on and damage portions of the seat.

14 Claims, 2 Drawing Sheets

RETRACTING CHILD SEAT RESTRAINING STRIKER AND METHODS OF USE

BACKGROUND OF THE INVENTION

1. Field of the Invention

The present invention relates to devices, systems, and processes useful as vehicle child seat restraints, and more specifically to such restraints that are positioned in the bightline of a seat.

2. Brief Description of the Related Art

ISO-FIX is a child seat restraining system standard that arose out of the need to secure child seats in vehicles, particularly in automobiles, in a secure, convenient, and uniform manner. ISO-FIX is defined in ISO 13216-1, "Road vehicles—Anchorages in vehicles and attachments to anchorages for child restraint systems—Part 1: Seat bight anchorages and attachments", (International Organization for Standards, Geneva, Switzerland, 15 Jul. 2004), the entirety of which is incorporated by reference herein.

According to the ISO-FIX standard, a 6 mm loop or wire, called a "striker", is firmly and rigidly attached, e.g., by welding, to the vehicle seat frame or the vehicle body itself. The striker is positioned in vehicle seating locations so that a person installing a child seat can attach a hook or other similar structure on the child seat to the striker, thus anchoring the child seat to the vehicle. One typical location for these IOS-FIX strikers is in the bightline of a vehicle seat, that is, in the space between a seat back and the seat bottom cushion. While this system can be secure, it presents difficulties in vehicle design.

More particularly, because of the shape and rigidity of the fixed striker wires, and the bightline location required by the ISO-FIX standard, many design and packaging compromises must be made to avoid damaging the seat's cushion material, e.g., foam, and the seat's trim. For example, a mid-row seat that folds flat can not include large, comfortable bolsters or thick foam, because the striker(s) at that seat location push into the seat back when the seat is folded, thus damaging the seat.

There remains a need, therefore, for a child seat anchor striker that can be incorporated into vehicle seating which does not limit the design of the seat and which does not damage folding seats.

SUMMARY OF THE INVENTION

According to a first aspect of the invention, a retracting child seat restraining striker system comprises a vehicle seat having a bottom cushion and a back, the back configured and arranged to be movable between an upright position and a folded position, the bottom cushion having a front portion and a rear portion, the back having a lower portion adjacent to the bottom cushion rear portion, a support extending laterally across the vehicle seat adjacent to the bottom cushion rear portion and to the back lower portion, a striker extending through the support and at least partially toward the bottom cushion front portion, the striker having a front loop and a rear, a load transmission member attached to the striker rear, and means for automatically sliding the striker away from the bottom cushion, from the seat back, or from both, when the seat back is folded.

According to another aspect of the present invention, a method of retracting a child seat restraining striker positioned in the bightline of a vehicle seat comprises attaching the striker to a load transmission element, moving a portion of the seat, transmitting motion of said portion of the seat to said load transmission element, and moving said striker with said load transmission element.

According to yet another aspect of the present invention, a method of retracting a child seat restraining striker positioned in the bightline of a vehicle seat comprises attaching the striker to a load transmission element, moving a portion of the seat, sensing motion of said portion of the seat, and moving said striker with said load transmission element upon said sensing.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
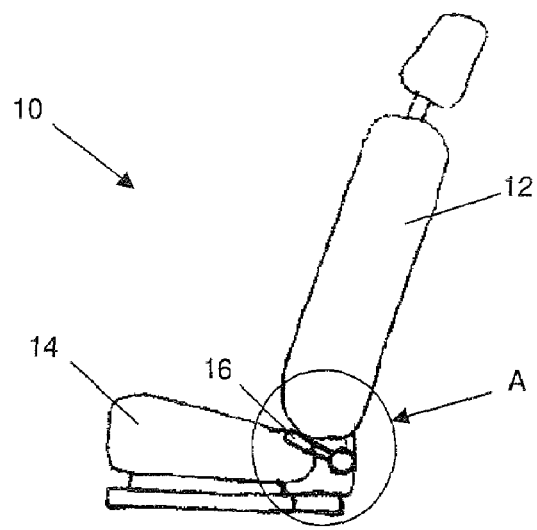
FIG. 1 illustrates a simplified side view of a vehicle seat including an ISO-FIX striker of the present invention.

Referring to the drawing figures, like reference numerals designate identical or corresponding elements throughout the several figures.

In general terms, a principle of the present invention includes a striker which retracts away from seat cushions when the seat is folded. Retracting the striker can be accomplished in numerous ways, including retracting the striker using a mechanical linkage with a portion or portions of the seat that move when the seat is folded, and/or retracting the striker using an electromechanical device, coupled with a limit switch, which is activated when the seat is folded.

With specific reference to the drawing figures, FIG. 1 illustrates a vehicle seat 10 having a foldable seat back 12, a seat bottom 14, and an ISO FIX striker 16 located in the bightline between the back and the bottom. The seat 10 can be a seat in any known vehicle, e.g., automobile, train, airplane, boat, and the like.

Figure 2:
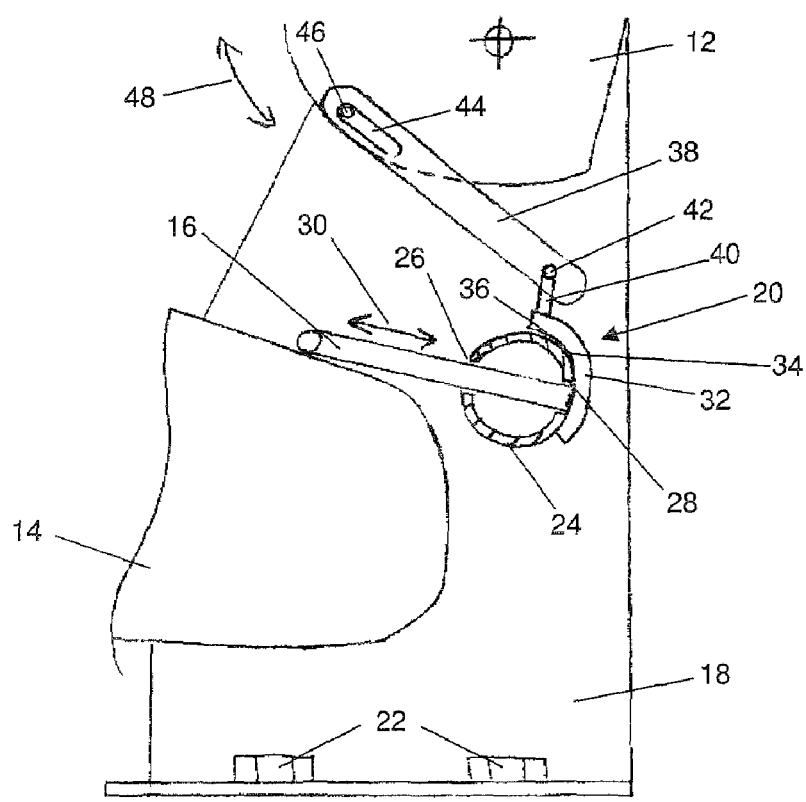
FIG. 2 illustrates the enlarged portion A from FIG. 1, including an exemplary embodiment of a striker in accordance with the present invention.

FIG. 2 illustrates the enlarged portion A from FIG. 1, including the bightline portion of the seat 10. The seat 10 is attached to the vehicle (not itself illustrated) via a mounting foot 18 using known methods, such as attaching via bolts 22, welding, or the like. A striker mechanism 20 embodying principles of the present invention is located in the bightline of the seat, and includes an ISO-FIX striker 16 which extends from a location of the seat behind a rear portion of the seat bottom 14 toward the front of the seat bottom, and optionally can extend somewhat upward from the same location toward the upper portions of the seat back 12. A tube, plate, bracket, or other support 24 extends laterally across the seat roughly in the bightline, and is rigidly attached to portions of the seat or the vehicle itself, preferably in a manner that satisfies the ISO-FIX standard. While the support 24 is illustrated as having an annular cross-section, i.e., is a tube, the support can have any cross-sectional shape which can adequately bear the load of a child seat when secured to the striker 16.

The support 24 includes a front opening 26 and a rear opening 28, through which the striker 16 extends with sufficient clearance that the striker can slide, as schematically indicated by slide direction 30. Rear portions of the striker 16 are firmly attached to a load bearing and transferring element 32 which is positioned at the rear of the support 24. As can be seen in FIG. 2, the striker 16 extends through the rear opening 28 and is attached to the load bearing and transferring element 32, which has a shape 36, on portions adjacent to the support 24, which is complementary to the external shape of the rear of the support 24. In this manner, when the striker 16 is in its most forward position, illustrated in FIG. 2, the load bearing and transferring element 32 bears against the support over a large surface area, thus transferring and distributing load from the striker to the support. The present invention is not limited to the concave and convex shapes of the support 24 and element 32 illustrated in FIG. 2, and numerous other shapes are within the scope of this invention.

According to a first exemplary embodiment of the present invention, a link 38 acts to transfer motion of a portion of the seat, e.g., the pivoting of the seat back 12, to the striker 16 to move the striker from its forward, operational position (FIG. 2) to one in which the striker is out of the way of the seat components and will, therefore, not damage the seat. The link 38 is attached to the load element 32, e.g., directly or via a secondary link 40 at a point 42, and to a portion of the seat, e.g., the seat back 12. By way of non-limiting example, the seat back 12 can include a pin 46 which extends into and is secured in a slot 44 formed in the link 38. When the seat back 12 is rotated down 48, the pin 46 rides through the length of the slot 44 until it reaches the rearmost end of the slot, at which point the pin pushes the link 38 rearward and optionally downward. Rearward (and optional downward) motion of the link 38 is transferred to the load element 32, which moves in the same direction 30, pulling the striker 16 through the openings 26, 28 in the support 24 and away from the seat.

Figure 3:
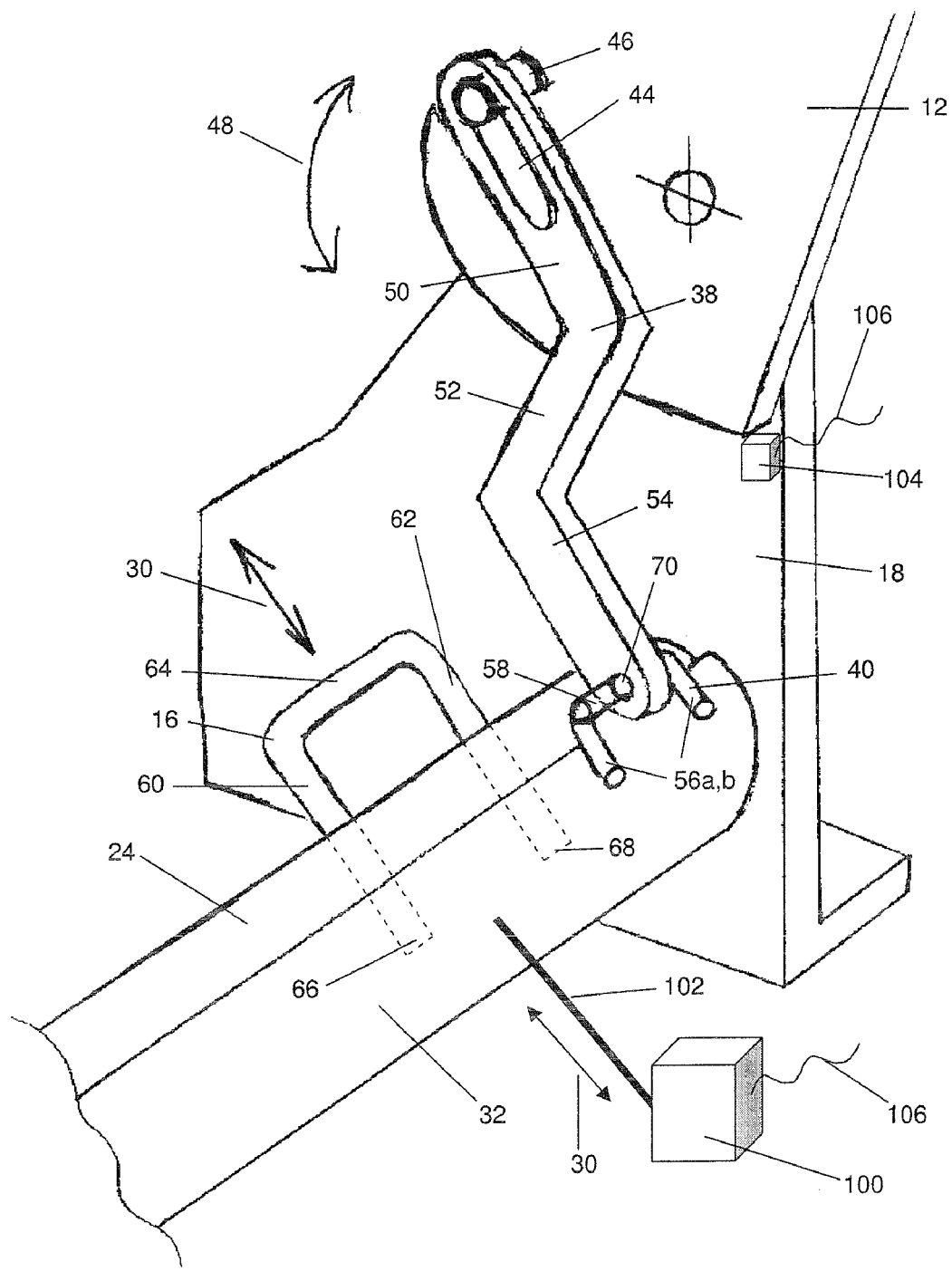
FIG. 3 illustrates an enlarged perspective view of portions of the striker mechanism of FIG. 1, including a further embodiment.

FIG. 3 illustrates additional exemplary details of the mechanism described above. The link 38 can be any shape that will perform the functions described herein, including, but not limited to, a multi-angled link as illustrated in FIG. 3. Such a link 38 can include end links 50, 54, joined by an intermediate link 52 that joins the two end links and which transfers the motion toward a point spaced from the sear frame or mounting foot 18. The secondary link 40, when provided to attach to the link 38, is attached at a point, e.g., a through hole 70 of link 38, via a crossmember 58 joined to the load element 32 by a pair of legs 56 a, b.

The striker 16 can take any of numerous forms, and is not restricted to the form illustrated herein. By way of example and not of limitation, the striker 16 can include a pair of legs 60, 62, which extend through the support 24 and have rearward ends 66, 68, respectively, which are attached to the load element 32, as described above, and a crossmember 64 to which a child safety seat can be attached.

FIG. 3 also illustrates another exemplary embodiment in accordance with the present invention, which can be used in conjunction with, or as an alternative to, certain structures described herein. In this additional embodiment, motion of the striker 16 away from the seat can be affected by an electromechanical device, e.g., a motor 100, e.g., a linear motor. The motor is attached to the load element 32 by a simple link 102, so that activation of the motor 100 pulls the load element and striker 16 backwards (and optionally downwards). While FIG. 3 illustrates the motor 100 positioned generally behind the load element 32, the motor and link 102 can be positioned in any position at which motion in these directions can be caused. Activation of the motor 100 can be made by one or more of numerous ways, including the generation of a signal by a limit switch 104 communicated to the motor via an electrical circuit 106. By way of example, the limit switch 104 can be positioned to sense whether a portion of the seat, e.g., a portion of the seat back 12, is in an upright position; when it is not, the switch generates a signal which is communicated to the motor 100 (and any associated control circuitry) and causes the motor to retract the striker 16.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A retracting child seat restraining striker system, the system comprising:
    a vehicle seat having a bottom cushion and a back, the back configured and arranged to be movable between an upright position and a folded position, the bottom cushion having a front portion and a rear portion, the back having a lower portion adjacent to the bottom cushion rear portion;
    a support extending laterally across the vehicle seat adjacent to the bottom cushion rear portion and to the back lower portion;
    a striker extending through the support and at least partially toward the bottom cushion front portion, the striker having a front loop and a rear;
    a load transmission member attached to the striker rear; and
    means operably attached between the seat back and the load transmission member, for automatically sliding the striker away from the bottom cushion, from the seat back, or from both, when the seat back is folded.

2. A system according to claim 1, wherein the means for sliding is connected to the load transmission member.

3. A system according to claim 1, wherein the means for sliding comprises a link attached to the seat back and to the load transmission member.

4. A system according to claim 3, wherein the link comprises a slot, and the seat back comprises a pin, the pin slideably received in the link slot.

5. A system according to claim 1, wherein the means for sliding comprises a motor attached to the load transmission member, and a limit switch in control signal communication with the motor, the limit switch positioned to sense when the seat back is folded.

6. A system according to claim 1, wherein the motor comprises a linear motor.

7. A system according to claim 1, wherein the support comprises a tube.

8. A system according to claim 7, wherein the support tube defines an outer shape, and wherein the load transmission member comprises a shape complementary to the support tube outer shape.

9. A method of retracting a child seat restraining striker positioned in the bightline of a vehicle seat, the striker connected to a load transmission element, the load transmission element connected to a portion of the seat back, the method comprising:

moving said portion of the seat back;

transmitting motion of said portion of the seat back to said load transmission element; and moving said striker to a retracted position with said load transmission element.

10. A method according to claim 9, wherein the vehicle seat includes a child seat restraining striker support, and wherein moving said striker comprises moving the striker through said support.

11. A method according to claim 9, wherein the vehicle seat includes a child seat restraining striker support, and wherein moving said striker comprises:

moving the load transmission element from a first position in contact with said support, to a second position retracted from said support.

12. A method of retracting a child seat restraining striker positioned in the bightline of a vehicle seat, the striker connected to a load transmission element, the method comprising:

moving said portion of the seat back;

sensing motion of said portion of the seat back; and moving said striker to a retracted position with said load transmission element upon said sensing.

13. A method according to claim 12, wherein sensing comprises sensing with a limit switch positioned to sense motion of a portion of said seat back.

14. A method according to claim 12, wherein moving the striker comprises moving with a motor.

* * * * *